United States Patent [19]

Smoltich et al.

[11] 3,997,965
[45] Dec. 21, 1976

[54] APPARATUS AND METHOD FOR SHAPING AND PLACING LUBRICANT WICKING MATERIAL

[75] Inventors: Paul R. Smoltich, DeKalb; James W. Wilson, Sycamore, both of Ill.

[73] Assignee: General Electric Company, Fort Wayne, Ind.

[22] Filed: July 8, 1975

[21] Appl. No.: 594,123

[52] U.S. Cl. .............................. 29/596; 29/33 K; 29/205 D; 29/235; 29/451; 264/136; 264/268; 264/310; 264/334; 310/90; 425/403; 425/438

[51] Int. Cl.² ...................................... H02K 15/14

[58] Field of Search ................. 29/596, 598, 205 R, 29/205 D, 419, 451, 235, 33 K, 148.4 L; 264/136, 268, 310, 334, 336, 339, 295; 425/403, 391, 436 R, 438; 310/90; 53/118, 119, 122

[56] References Cited

UNITED STATES PATENTS

| | | | |
|---|---|---|---|
| 1,447,816 | 3/1923 | Peelle | 264/268 |
| 2,501,652 | 3/1950 | Barrickman | 226/27 |
| 2,540,272 | 2/1951 | Malmstrom et al. | 226/19 |
| 2,731,183 | 1/1956 | Shaw | 29/235 |
| 2,751,265 | 6/1956 | Wightman | 308/132 |
| 2,752,208 | 6/1956 | Wightman | 308/171 |
| 2,821,748 | 2/1958 | Willi | 425/438 |
| 3,145,313 | 8/1964 | Tupper | 310/42 |
| 3,795,964 | 3/1974 | Beckman | 425/403 |
| 3,797,089 | 3/1974 | Abel | 29/419 |

*Primary Examiner*—Carl E. Hall
*Attorney, Agent, or Firm*—Joseph E. Papin

[57] ABSTRACT

Apparatus is provided for shaping a generally elongate strip of lubricant wicking material and placing it into a component for a dynamoelectric machine. In this apparatus, means is provided for receiving the strip when it is introduced thereinto, and means associated with the receiving means is operable generally for moving the strip therefrom and converting the shape of the strip into a predetermined configuration. Means is provided for predeterminately locating the dynamoelectric machine component on the apparatus with respect to the moving and converting means, and means is operable for displacing the strip generally in its predetermined configuration from the moving and converting means into place within the dynamoelectric machine component.

A method of forming the strip and transferring it into means for containing it in the dynamoelectric machine component is also disclosed along with a method of assembling the strip in the dynamoelectric machine component and a method of operating means for shaping the strip and placing in the dynamoelectric machine component.

21 Claims, 8 Drawing Figures

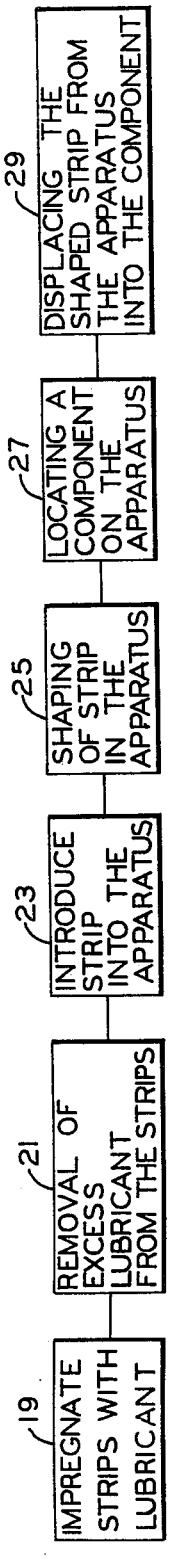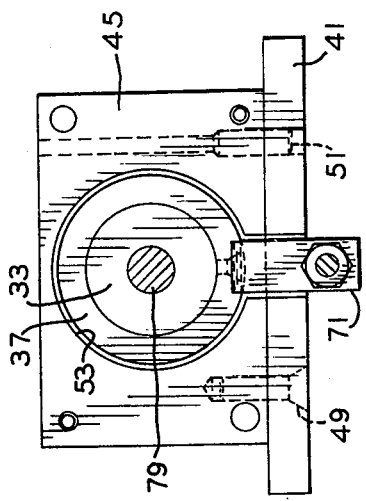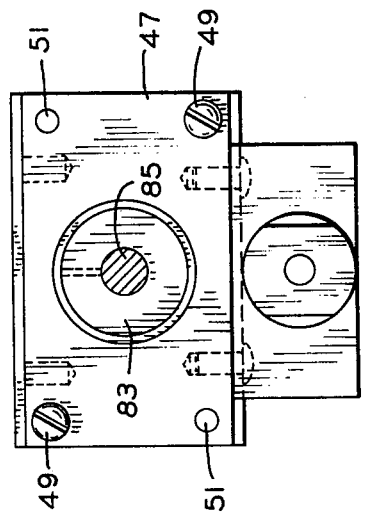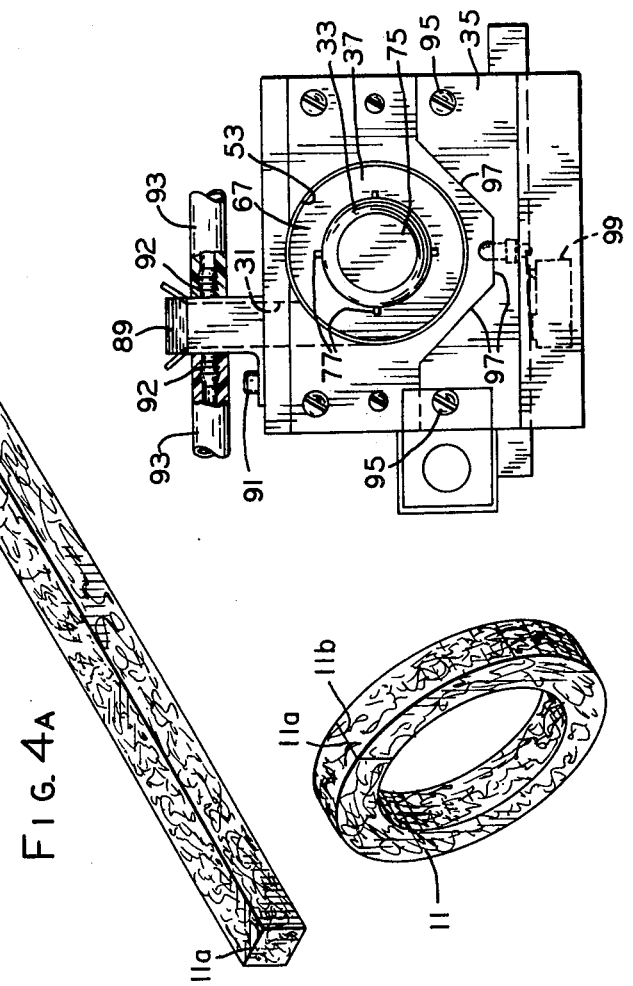

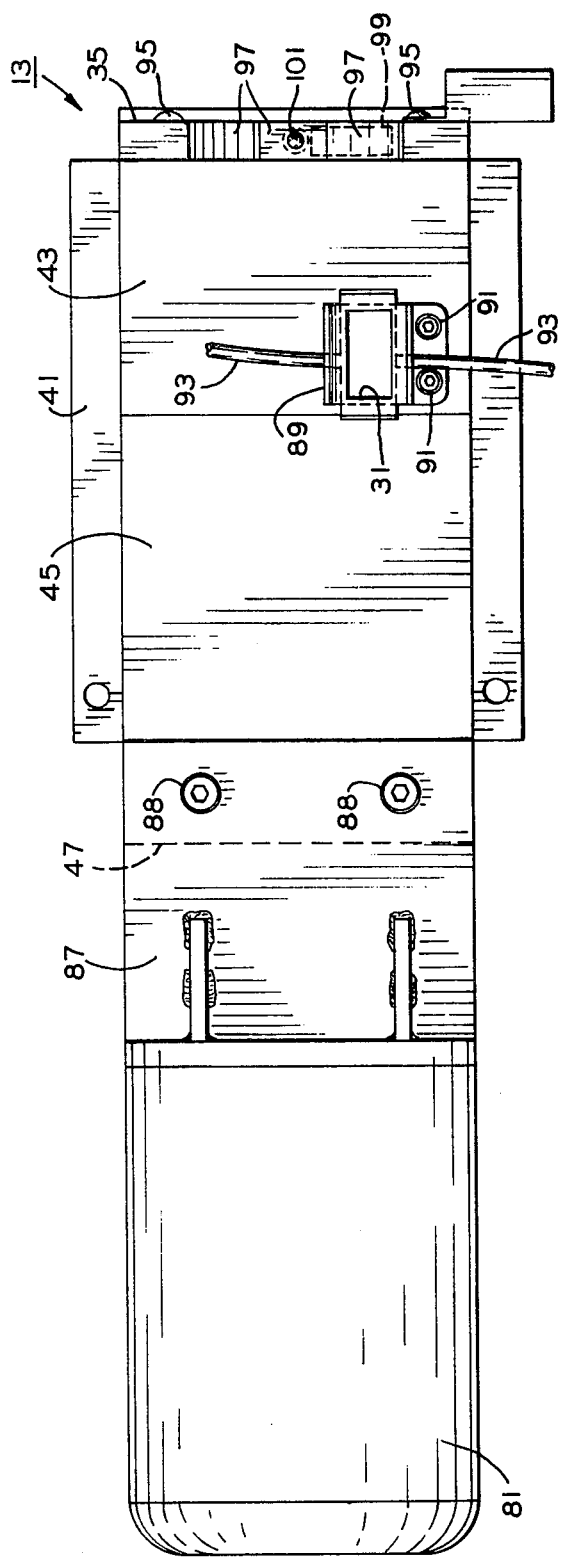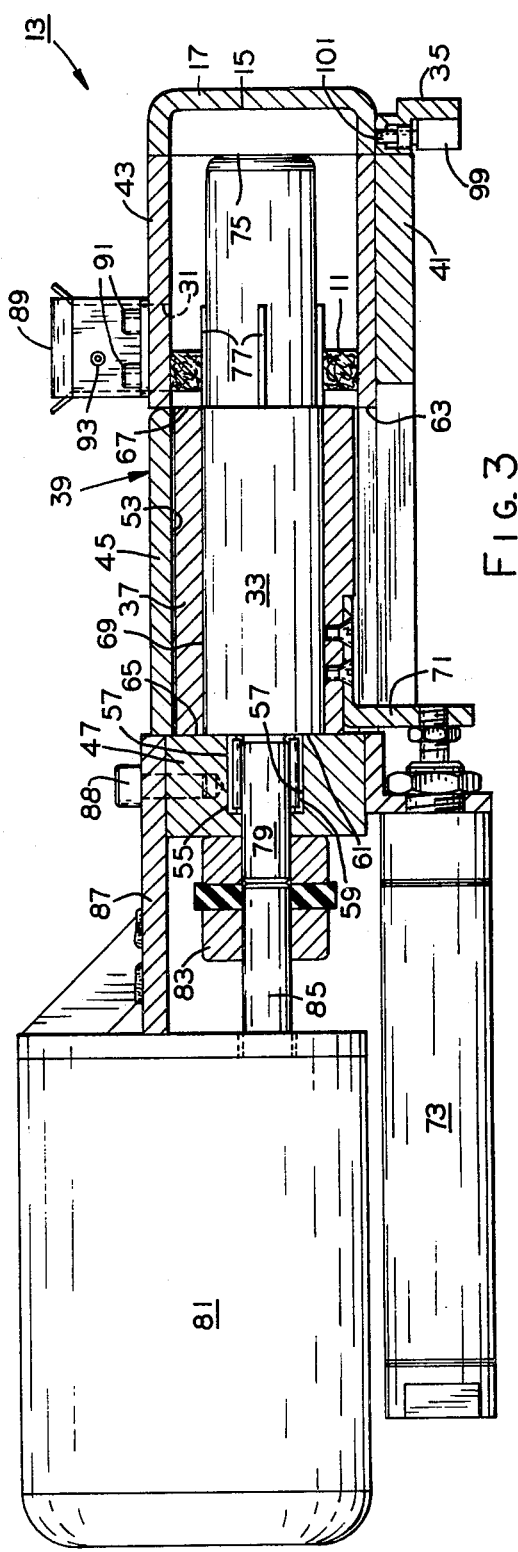

APPARATUS AND METHOD FOR SHAPING AND PLACING LUBRICANT WICKING MATERIAL

FIELD OF THE INVENTION

This invention relates generally to dynamoelectric machines and in particular to apparatus for shaping a generally elongate strip of lubricant wicking material and placing it into a component of a dynamoelectric machine, a method for forming the strip and transferring it to the dynamoelectric machine component, a method of assembling the strip in the dynamoelectric machine component, and a method of operating means for shaping the strip and placing it in the dynamoelectric machine component.

In the past, various types of felt or other natural and synthetic fibers or materials or the like were utilized as lubricant wicking materials in a lubricant reservoir for storing and feeding lubricant therefrom to a bearing of various devices, such as a dynamoelectric machine for instance. These lubricant wicking materials were also provided in various shapes or configurations. For instance, one of the past lubricant wicking materials was shaped generally in the form of a doughnut or annular plate, and others, as illustrated in U.S. Pat. Nos. 2,751,265 and 2,752,208, were generally flat strips. These flat strips were formed by hand generally into the shape of a hollow cylinder and then placed by hand into a lubricant cavity of dynamoelectric machine along with other wicking material having various other shapes. While the inventive concepts of these patents undoubtedly included many salient features providing contributions to the art, one of the disadvantageous or undesirable features of this type of lubricant wicking material assembly involved the time consuming and costly hand forming of the strips and the hand placement thereof into the lubricating cavity.

SUMMARY OF THE INVENTION

Among the several objects of the present invention may be noted the provision of apparatus for shaping a strip of lubricant wicking material and placing it into a component of a dynamoelectric machine, a method for forming the strip and placing it in the dynamoelectric machine component, a method of assembling the strip in the dynamoelectric machine component, and a method of operating means for shaping the strip and placing it in the dynamoelectric machine component which respectively overcome the aforementioned disadvantageous or undesirable features discussed hereinabove with respect to the prior art as well as others; the provision of such apparatus, such forming and transferring method, such assembling method and such operating method which are simplistic in nature, economical, and easily incorporated into a manufacturing process or assembly line. These as well as other objects and features of the present invention will be in part apparent and in part pointed out hereinafter.

In general, apparatus is provided in one form of the invention for shaping a generally elongate strip of lubricant wicking material having a predetermined length with a pair of opposite ends and placing the strip into a component for a dynamoelectric machine. In this apparatus, means is provided for receiving a leading one of the opposite ends of the strip when it is introduced thereinto, and means associated with the receiving means is operable generally for rotatably advancing the leading one opposite end of the strip with respect to the other of the opposite ends of the strip so as to convert the shape of the strip into at least a generally arcuate configuration with the opposite ends disposed generally in opposed relation. With the opposite ends disposed in the opposed or facing relation, the opposite ends may be abutted or spaced apart in the at least generally arcuate configuration of the strip. Means is provided for predeterminately locating the dynamoelectric machine component on the apparatus with respect to the rotatably advancing means, and means is also provided for displacing the strip in its at least generally arcuate configuration with the opposite ends in opposed relation from the rotatably advancing means into place within the dynamoelectric machine component.

Further in general in the manufacture of a dynamoelectric machine, a method is provided in one form of the invention for forming lubricant wicking material in a device for shaping it and transferring the lubricant wicking material into means for containing it in a component for the dynamoelectric machine. In this forming and transferring method, the lubricant wicking material is provided in a generally elongate strip having a predetermined length and a pair of opposite ends, and the strip is fed generally lengthwise thereof into the shaping device. The strip is then advanced in the shaping device toward a position in which the strip is confined generally in predetermined shape with the opposite ends of the strip disposed generally in the facing relation. Thereafter, the strip is ejected generally in its predetermined shape from the shaping device into place within the containing means of the dynamoelectric machine component.

Still further in general and in one form of the invention, a method is provided for assembling a generally elongate strip of lubricant wicking material having a predetermined length and opposite end portions within means for containing the strip in a component for a dynamoelectric machine. In this assembly method, the strip is formed in a shaping device at least into a predetermined configuration adapted to fit within the confines of the containing means of the dynamoelectric machine component with the opposite ends of the strip disposed so as to be generally opposed with respect to each other, and the strip is then displaced from the shaping device generally in its predetermined arcuate configuration with the opposite ends generaly opposed with respect to each other into place within the containing means.

Also in general, a method in one form of the invention is provided for operating means for shaping a generally elongate strip of lubricant wicking material having a predetermined length with opposite ends and placing it in a component of a dynamoelectric machine. In this operating method, the strip is received in the shaping means and converted therewithin into a predetermined generally annular configuration with the opposite ends of the strip disposed generally in facing relation, and the strip is then displaced in its generally annular configuration with the opposite ends thereof disposed generally in the facing relation from the shaping means into containment within the dynamoelectric machine component.

BRIEF DESCRIPTION OF THE DRAWINGS

FIG. 1 is a flow diagram illustrating principles of a method in one form of the invention which may be practiced in the manufacture of a dynamoelectric machine for forming a generally elongate strip of lubricant wicking material in a device for shaping it and transferring the strip into means for containing it in a component for the dynamoelectric machine;

FIG. 2 is a plan view of apparatus in one form of the invention for shaping the generally elongate strip of lubricant wicking material and placing it into the dynamoelectric machine component;

FIG. 3 is a sectional view taken generally along line 3—3 of FIG. 2 and showing the strip shaped in a predetermined configuration within the apparatus prior to its placement in the dynamoelectric machine component located on the apparatus;

FIGS. 4A and 4B are isometric views illustrating the strip of lubricant wicking material in its free length or shape and in its predetermined configuration as formed by the apparatus of FIG. 2, respectively;

FIG. 5 is a right-side elevational view of the apparatus of FIG. 2; and

FIGS. 6 and 7 are sectional views taken generally along line 6—6 and line 7—7 of FIG. 2, respectively.

Corresponding reference characters indicate corresponding parts throughout the several views of the drawings.

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENTS

Referring now to the drawings in general, in the manufacture of a dynamoelectric machine (not shown), a method in one form of the invention is illustrated for forming a generally elongate strip 11 (FIG. 4A) of lubricant wicking material in a device or apparatus 13 (FIGS. 2, 3, and 5–7) for shaping it and transferring or placing the strip into means, such as a well or recess 15, for containing it in a component 17 (FIG. 3) for the dynamoelectric machine. In this shaping and transferring method (as shown in flow diagram form in FIG. 1), strip 11 is fed either manually or mechanically into shaping apparatus 13, and the strip is advanced in the shaping apparatus toward a position (as best seen in FIG. 2) in which the strip is confined generally in a predetermined generally arcuate or annular shape or configuration (FIG. 4B). Strip 11 is then ejected generally in its predetermined shape from shaping apparatus 13 into place within the containing means or recess 15 of dynamoelectric machine component 17.

More particularly and with specific reference to FIG. 4A, it may be noted that strip 11 has a generally square cross-section and is elongate in form having a pair of opposite ends or end portions 11a, 11b; however, it is contemplated that strips having other forms and different lengths may be utilized within the scope of the invention so as to be generally commensurate with the objects and advantages thereof. After strip 11 has been severed in its predetermined length from a roll of the lubricant wicking material (not shown), the strip (along with others thereof) is impregnated with a liquid lubricant, such as suitable bearing lubrication oil, as indicated by box 19 of FIG. 1, and if excess oil is then present in the strip, such may be removed by any suitable means well known to the art, such as a spinning or centrifuging process or operation for instance, as illustrated by box 21 of FIG. 1. In the method of the present invention, strip 11 is fed or introduced manually by an operator into shaping apparatus 13, as indicated by box 23 in FIG. 1; however, it is contemplated that the strip may be mechanically introduced into the shaping apparatus, if desired, by suitable means well known to the art within the scope of the invention so as to be generally commensurate with the objects and advantages thereof. Strip 11 is then shaped (or re-shaped) into its aforementioned predetermined configuration (as best seen in FIG. 4B) by the operation of apparatus 13, as indicated by box 25 in FIG. 1 and as discussed in greater detail hereinafter, and at this time, dynamoelectric machine component 17 may be predeterminately located or aligned on the apparatus to receive the strip in place within recess 15, as indicated by box 27 in FIG. 1 and as shown in FIG. 3. When dynamoelectric machine component 17 is so located, strip 11 may be ejected, transferred or displaced generally in its predetermined configuration from apparatus 13 into place within the located or aligned recess 15 of the dynamoelectric machine component, as shown by box 29 in FIG. 1. While dynamoelectric machine component 17 is shown for purposes of disclosure as a retaining cup for lubricant wicking material which is adapted for assembly to an end shield of a dynamoelectric machine (not shown), it is contemplated that other components, such as the end sield for instance, may be employed and located on apparatus 13 within the scope of the invention so as to be generally commensurate with the objects and advantages thereof.

From the foregoing discussion and referring again in general to the drawings, it may be noted that another method in one form of the invention for assembling strip 11 within recess 15 of dynamoelectric machine component 17 is also provided. In this assembling method, strip 11 is formed into its predetermined configuration adapted to fit within the confines of recess 15 of dynamoelectric machine component 17, and the strip is displaced generally in its predetermined configuration into place within the recess.

As shown in FIGS. 2, 3, and 5–7, apparatus 13 is provided in one form of the invention for shaping (or reshaping) the generally elongate strip 11 of lubricant wicking material and placing it into dynamoelectric machine component 17. In apparatus 13, means, such as at least a passage or opening 31 or the like, is provided for receiving strip 11 when a leading one of ends 11a, 11b, is introduced thereinto, and means, such as a mandrel, arbor, or sleeve 33 or the like, associated with the receiving means or passage 31, is operable generally for moving the strip therefrom and for converting the shape of the strip into the predetermined configuraion thereof as illustrated in FIG. 4B. Means, such as a fixture 35 or the like, is provided for predeterminately locating dynamoelectric machine component 17 on apparatus 13 with respect to the moving and converting means or mandrel 33, and means, such as a push collar or sleeve 37, is also provided for displacing strip 11 generally in its predetermined configuration from the mandrel into place within dynamoelectric machine component 17.

More particularly and with specific reference to FIGS. 2 and 3, apparatus 13 has a housing 39 generally constituted by a base 41, a load block 43, a push collar cover or block 45, and a support or bearing block 47. Base 41 may be mounted to a work table or the like by any suitable means well known to the art (not shown) so that the apparatus may be positioned either generally vertically or horizontal. Load block 43 and cover 45 are attached to base 41 and support block 47 is attached to the cover by suitable means, such as a plurality of machine screws 49 and/or dowel pins 51, as also illustrated in FIGS. 6 and 7. A pair of stepped bores 53, 55 are provided in housing 39 with the larger stepped bore 53 extending through load block 43 and cover 45 and the smaller stepped bore 55 extending through support block 47. Smaller stepped bore 55 is recessed at 57 to receive a bearing 59 therein, and a generally annular shoulder or abutment 61 is provided on support block 47 between stepped bores 53, 55. Base 41 and cover 45 are slotted, as indicated at 63, and slot 63 intersects with larger stepped bore 53 for generally the entire length of the cover. Passage 31 is provided in load block 43 intersecting with larger stepped bore 53.

Push collar 37 is slidably received in larger stepped bore 53 having a pair of opposite ends 65, 67 intersected by a bore 69 in the push collar which is generally coaxial with stepped bores 53, 55, and a bracket 71 extends through slot 63 in base 41 and cover 45 having one end connected with a peripheral portion of the push collar and the other end thereof connected with means, such as a double acting air or hydraulic motor 73 or the like, for reciprocally driving or axially moving the push collar in the larger stepped bore. In its generally at-rest position (as seen in FIG. 3), push collar 37 has one of its opposite ends 65 disposed in engagement with shoulder 61 of support block 47, and the other of the opposite ends 67 of the sleeve is disposed generally adjacent opening 31 in load block 43.

Mandrel 33 is rotatably mounted in push collar bore 69 so as to be generally concentric with push collar 37, and the mandrel extends generally coaxially through larger stepped bore 53. A free end 75 is provided on mandrel 33 which terminates generally adjacent the open end of larger stepped bore 53, and a plurality of means, such as radially and axially extending flutes 77 or the like, are provided on the mandrel within the larger stepped bore generally adjacent or opposite the intersection of passage 31 therewith for gripping or advancing engagement with strip 11 upon the introduction thereof into the passage, as discussed hereinafter. Mandrel 33 is also provided with an integral extension 79 which extends through smaller stepped bore 55 in support block 47 being suitably journaled in bearing 59 disposed in recess 57 of the smaller stepped bore, and the mandrel extension has a portion disposed exteriorly of housing 39 for connection with means, such as a gear motor 81 or the like, for rotatably driving the mandrel. A resilient coupling 83 of any suitable type well known in the art is connected between a drive shaft 85 of gear motor 81 and mandrel extension 79 exteriorly of housing 39, and a bracket or support 87 connected with the gear motor is mounted by suitable means, such as a plurality of bolts 88 or the like, to support block 47.

As shown in FIGS. 2 and 5, a guide 89 is secured by suitable means, such as screws 91, to load block 43 in alignment with passage 31 therein to facilitate the loading of strip 11 into apparatus 13. A pair of barb fittings 92 are provided on guide 89, and tubing 93 mounted to the barb fittings supplies a jet stream of air across passage 31 through the barb fittings. A Jetron pressure switch (not shown) of a type well known to the art and available from Automation Devices, Fairview, Pennsylvania, is connected in pressure fluid communication with tubing 93. When strip 11 is loaded into guide 89, the strip breaks or interrupts the jet stream of air across the guide between barb fittings 92 thereby to actuate the Jetron pressure switch which, in turn, effects the energization of gear motor 81 through a timer (not shown), as discussed hereinafter.

Locating means or fixture 35 is attached to the end of loading block 43 adjacent larger stepped bore 53 therein by suitable means, such as a plurality of screws 95 as shown in FIGS. 2 and 3, and in loading dynamoelectric machine component 17 to apparatus 13, the operator merely places or locates the dynamoelectric machine component on locating surfaces 97 of the fixture thereby to coaxially align the component recess 15 with mandrel 33 and sleeve 37 about the end of larger stepped bore 53 in loading block 43. The operator holds dynamoelectric machine component 17 in its located or aligned position on locating surfaces 97 of fixture 35 until strip 11 is displaced from apparatus into place in recess 15 of the dynamoelectric machine component, as discussed in detail hereinafter. A microswitch 99 of any type well known to the art is mounted to fixture 35, and an actuator for the micro-switch, such as a push button 101 is also provided in the fixture for displacement by dynamoelectric machine component 17 as it is loaded by the operator into the fixture. Limit switch 99 controls the actuation of cylinder 73 through an electrical circuit (not shown) as discussed hereinafter. Of course, it is contemplated that other fixtures for locating purposes may be employed with apparatus 13 within the scope of the invention.

From the foregoing description of apparatus 13, it may be noted that a method in one form of the invention is provided for operating means, such as apparatus 13, for shaping strip 11 and placing it in dynamoelectric machine component 17. In this operating method, strip 11 is received in the shaping means or apparatus 13 and converted therewithin into a predetermined configuration, and the strip is then displaced generally in its predetermined configuration from apparatus 13 into containment within dynamoelectric machine component 17.

To complete the description of apparatus 13 and the various methods of forming or shaping strip 11, it may also be noted that while the predetermined configuration of the strip is shown in FIG. 4B as generally doughnut-shaped, arcuate or annular, it is contemplated that the strip may be provided with other shapes within the scope of the invention so as to be commensurate with the objects and advantages thereof.

OPERATION

With the component parts of apparatus disposed generally as shown in the drawings and as described hereinabove, the operator initially introduces strip 11 lengthwise into guide 89 so that the leading one of ends 11a, 11b passes through passage 31 in loading block 43 into larger stepped bore 53. Of course, as previously mentioned, the passage of strip 11 into guide 89 interrupts the flow or jet stream of air therethrough between barb fittings 91, and upon such interruption of the jet air stream, the Jetron pressure switch (not shown) associated therewith is actuated to effect a timed energization of gear motor 81. Upon its timed energization, shaft 85 of gear motor 81 rotatably drives mandrel 33 through coupling 83 thereby to rotate flutes 77 on the mandrel into gripping engagement with strip 11 as it passes through passage 31 into larger stepped bore 53. Such rotation of flutes 77 into gripping engagement with strip 11 drives or advances the strip so as to roll it about mandrel 33 into its predetermined generally arcuate or annular configuration with ends 11a, 11b disposed generally in facing or opposed relation, and the strip is guided between the mandrel and larger stepped bore 53 as it is advanced toward a position within the larger stepped bore in which the predetermined configuration thereof is attained. As previously mentioned, the energization of gear motor 81 is timed, and when strip 11 has been so rolled or advanced at least through a part of one revolution of mandrel 33 to its predetermined configuration about mandrel 33 by the driven rotation thereof, the timed operation of the gear motor is effective to de-energize it. Of course, such de-energization of gear motor 81 terminates the driven rotation of mandrel 33 wherein strip 11 is disposed thereabout in its predetermined configuration between the mandrel and larger stepped bore 53.

At this time, the operator manually loads dynamoelectric machine component 17 onto fixture 35 into locating engagement with locating surfaces 97 (as seen in FIG. 2) so as to locate recess 15 in the dynamoelectric machine component generally about the end of larger stepped bore 53 and generally coaxially with mandrel 33 and push collar 37. The operator then holds dynamoelectric machine component 17 in its located position until apparatus 13 functions to displace strip 11 generally in its predetermined configuration into recess 15 of the dynamoelectric machine component, as described hereinbelow. Of course, when dynamoelectric machine component 17 is so located on fixture 35, a peripheral portion of the dynamoelectric machine component depresses push button 101 thereby to actuate micro-switch 99 which effects energization of a circuit (not shown) for actuating air motor 73. When so actuated, air motor 73 and its bracket 71 axially or protractally moves or drives push collar 37 from its generally at-rest position in larger stepped bore 73 (as seen in FIG. 2) toward its advanced position therein, i.e., toward the open end of the larger stepped bore and dynamoelectric machine component 17 in its located position adjacent thereto. As push collar 37 is so moved from its at-rest position, end 67 of the push collar engages strip 11 which, as previously mentioned, is disposed in its predetermined configuration between mandrel 33 and larger stepped bore 53. Of course, further driven movement of push collar 37 axially in larger stepped bore 53 toward its advanced position thereafter moves strip 11 in its predetermined configuration along both mandrel 33 and the larger stepped bore ejecting the strip from apparatus 13 and displacing the strip generally in its predetermined configuration into confinement within recess 15 of dynamoelectric machine component 17.

After apparatus 13 has operated to effect the injection of strip 11 generally in its predetermined configuration into place within recess 15 of dynamoelectric machine component 17, the operator then removes the dynamoelectric machine component from fixtue 35 for storage or further assembly with a dynamoelectric machine (not shown). Upon the removal of dynamoelectric machine component 17 from fixture 35, micro-switch 99 is effective to return push-button 101 toward its original position and also to energize the circuit (not shown) for actuating air motor 73 thereby causing it to axially return push collar 37 from its advanced position in larger stepped bore 53 toward its at-rest position re-engaging end 65 of the push collar with shoulder 61 on support block 47. Upon the return or retractile movement of push collar 37 to its at-rest position, apparatus 13 is reset for subsequent operation which is, of course, initiated upon the subsequent introduction by the operator of another strip 11 into guide 89 and passage 31 of the apparatus in the same manner as previously described.

From the foregoing, it is submitted that a novel apparatus 11 and a novel forming and transferring method, a novel assembling method, and a novel operating method have been presented meeting the objects and advantages set out hereinbefore, as well as others. It is contemplated that changes may be made in the arrangement, shapes and details of the component parts of such apparatus as well as in the steps of such methods by those having ordinary skill in the art without departing from the spirit of the invention or the scope thereof as set out in the claims which follow.

What we claim as new and desire to secure by Letters Patent of the United States is:

1. In the manufacture of a dynamoelectric machine, a method of forming lubricant wicking material in a device for shaping it and transferring the lubricant wicking material into means for containing it in a component for the dynamoelectric machine, the method comprising the steps of:
   a. providing the lubricant wicking material in a generally elongate strip having a predetermined length and a pair of opposite ends and feeding the strip generally lengthwise thereof into the shaping device;
   b. advancing the strip in the shaping device toward a position in which the strip is confined generally in a predetermined shape with the opposite ends of the strip disposed generally in facing relation; and
   c. ejecting the strip generally in its predetermined shape from the shaping device into place within the containing means of the dynamoelectric machine component.

2. The method as set forth in claim 1, comprising the preliminary step of locating the containing means to receive the strip in its predetermined shape.

3. The method as set forth in claim 1, comprising the preliminary step of impregnating the strip with a lubricant.

4. The method as set forth in claim 1, wherein the advancing step includes rotating a mandrel to engage means thereon for gripping the strip with the strip and rolling the strip generally about the mandrel into the predetermined shape of the strip.

5. The method as set forth in claim 4, wherein the ejecting step comprises stripping the strip generally in its predetermined shape from the mandrel into the containing means.

6. The method as set forth in claim 1, wherein the ejecting step comprises actuating means in the shaping device for driving the strip generally in its predetermined shape therefrom into the containing means.

7. A method of assembling a generally elongate strip of lubricant wicking material having a predetermined length and opposite end portions within means for containing the strip in a component for a dynamoelectric machine comprising the steps of:
   a. forming the strip in a shaping device at least into a predetermined arcuate configuration adapted to fit within the confines of the containing means of the dynamoelectric machine component with the opposite ends of the strip disposed so as to be generally opposed with respect to each other; and b. displacing the strip from the shaping device generally in its predetermined arcuate configuration with the opposite ends generally opposed with respect to each other into place within the containing means.

8. A method of operating means for shaping a generally elongate strip of lubricant wicking material having a predetermined length with opposite ends and placing it in a component of a dynamoelectric machine comprising the steps of:
  a. receiving the strip in the shaping means and converting it therewithin into a generally annular configuration with the opposite ends of the strip disposed generally in facing relation; and
  b. displacing the strip in its generally annular configuration with the opposite ends disposed generally in the facing relation from the shaping means into containment within the dynamoelectric machine component.

9. The method as set forth in claim 8, wherein the receiving and converting step comprises gripping the strip as it is inserted into the shaping means and moving the strip between a pair of relatively movable means in the shaping means for generally confining the strip in the generally annular configuration thereof.

10. The method as set forth in claim 9, wherein the displacing step comprises actuating means in the shaping means for axially moving the strip from between the confining means into place within the dynamoelectric machine component.

11. Apparatus for shaping a generally elongate strip of lubricant wicking material having a predetermined length with a pair of opposite ends and placing the strip into a component for a dynamoelectric machine comprising:
  a. means for receiving a leading one of the opposite ends of the strip when it is introduced thereinto;
  b. means associated with said receiving means and operable generally for rotatably advancing the leading one opposite end of the strip with respect to the other of the opposite ends of the strip so as to convert the shape of the strip into at least a generally arcuate configuration with the opposite ends disposed generally in opposed relation;
  c. means for predeterminately locating the dynamoelectric machine component on said apparatus with respect to said rotatably advancing means; and
  d. means for displacing the strip in its at least generally arcuate configuration with the opposite ends in opposed relation from the rotatably advancing means into place within the dynamoelectric machine component.

12. The apparatus as set forth in claim 11, further comprising means coupled with said converting means and operable generally for driving it.

13. The apparatus as set forth in claim 12, further comprising means associated with said receiving means and responsive to the introduction of the leading one opposite end of the strip thereinto for initiating the operation of said driving means.

14. The apparatus as set forth in claim 11, further comprising means coupled with said displacing means and operable generally for driving it.

15. The apparatus as set forth in claim 14, further comprising means associated with said locating means and responsive to the location therein of the dynamoelectric machine component for initiating the operation of said driving means.

16. The apparatus as set forth in claim 11, wherein said converting means comprises a mandrel rotatably movable in the apparatus and onto which the strip is generally rolled into its at least arcuate configuration, and a plurality of means on the mandrel for gripping the leading one opposite end of the strip to pass it from said receiving means onto said mandrel.

17. The apparatus as set forth in claim 16, further comprising means associated with at least a part of said mandrel for guiding engagement with the strip as it is rolled onto the mandrel.

18. The apparatus as set forth in claim 16, wherein said displacing means includes a push collar movable generally along said mandrel for engaging the strip and sliding it in its at least generally arcuate configuration with the opposite ends in opposed relation off said mandrel into place within the dynamoelectric machine component.

19. Apparatus for shaping a generally elongate strip of lubricant wicking material having a selected length with a pair of opposite ends and placing the strip within means for containing it in a component of a dynamoelectric machine comprising a housing, a pair of generally concentric means adapted for axial and rotatable movement in said housing, respectively, means in said housing for the passage of a leading one of the opposite ends of the strip thereinto toward said rotatably movable one of said concentric means, a plurality of means on said rotatably movable one of said concentric means for gripping the leading one opposite end of the strip so as to rotatably advance it from said passage means generally between said rotatably movable one of said concentric means and said housing so as to form the strip into a at least a generally arcuate configuration with the leading one opposite end disposed generally in opposed relation with the other of the opposite ends upon the actuation of said rotatably movable one of said concentric means, means for predeterminately locating the containing means of the dynamoelectric means component with respect to said rotatably movable one of said concentric means and said axially movable one of said concentric means, and means associated with said axially movable one of said concentric means for axially displacing it with respect to said rotatably movable one of said concentric means so as to move the strip generally in its at least generally arcuate configuration with the opposite ends in opposed relation from said rotatably movable one of said concentric means into place within the containing means of the dynamoelectric machine component.

20. Apparatus for shaping a generally elongate strip of lubricant wicking material and placing it into a component for a dynamoelectric machine comprising a housing having a stepped bore therein, a shoulder on the housing between the stepped bores, means mounted to the housing generally externally thereof and adjacent one end of the larger of the stepped bores for locating the dynamoelectric machine component relative to the larger stepped bore, a push collar slidably received in the larger stepped bore and movable therein between an at-rest position and an advanced position including a pair of opposite ends, and another bore in the push collar intersecting the opposite ends thereof and generally coaxial with the stepped bores, one of the opposite ends being engaged with the shoulder in the at-rest position of the push collar, and an opening in the housing intersecting with the larger stepped bore adjacent the other of the opposite ends when the push collar is in its at-rest position and through which the strip is inserted into the larger stepped bore, and a mandrel rotatably mounted in the other bore and extending generally coaxially through the larger of the stepped bores, the mandrel including a reduced extension extending through the smaller of the stepped bores and adapted to be rotatably driven, and a plurality of flutes on the mandrel within the larger stepped bore generally opposite the opening therein for gripping engagement with the strip, the mandrel being rotatably driven to rotate the flutes into gripping engagement with the strip upon the insertion thereof into the larger stepped bore through the opening so as to roll the strip about the mandrel into a predetermined generally arcuate configuration between it and the larger stepped bore, and the push collar being thereafter movable from its at-rest position toward its advanced position to engage the other opposite end thereof with the strip and move the strip in its predetermined generally arcuate configuration along both the mandrel and the larger stepped bore through the one end thereof into place within the dynamoelectric machine component located adjacent the one end of the larger stepped bore.

21. A method of operating a device for shaping a generally elongate strip of lubricant wicking material having a predetermined length with a pair of opposite ends and placing it in a component for a dynamoelectric machine comprising the steps of:
   a. introducing the strip generally lengthwise thereof into the shaping device with one of the opposite ends leading the other thereof;
   b. advancing the leading one opposite end in the shaping device not more than one revolution with respect to the other opposite end so that the opposite ends are disposed generally in facing relation so as to form the strip into a generally annular configuration; and
   c. ejecting the strip in its generally annular configuration from the shaping means into place within the dynamoelectric machine component.

* * * * *